(12) United States Patent
Guerard et al.

(10) Patent No.: US 12,100,229 B2
(45) Date of Patent: Sep. 24, 2024

(54) OBJECT SCANNING FOR SUBSEQUENT OBJECT DETECTION

(71) Applicant: APPLE INC., Cupertino, CA (US)

(72) Inventors: Etienne Guerard, Cupertino, CA (US); Omar Shaik, San Bruno, CA (US); Michelle Chua, Seattle, WA (US); Zachary Z. Becker, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 17/406,134

(22) Filed: Aug. 19, 2021

(65) Prior Publication Data

US 2021/0383097 A1 Dec. 9, 2021

Related U.S. Application Data

(63) Continuation of application No. PCT/US2020/043358, filed on Jul. 24, 2020.
(Continued)

(51) Int. Cl.
*G06V 20/64* (2022.01)
*G06T 17/00* (2006.01)
(Continued)

(52) U.S. Cl.
CPC .............. *G06V 20/64* (2022.01); *G06T 17/00* (2013.01); *G06V 20/10* (2022.01); *G06V 20/647* (2022.01);
(Continued)

(58) Field of Classification Search
None
See application file for complete search history.

(56) References Cited

U.S. PATENT DOCUMENTS 8,860,661 B2 10/2014 Kasahara
9,299,013 B1\* 3/2016 Curlander .............. G06V 40/20
(Continued)

FOREIGN PATENT DOCUMENTS

CN 104205880 A 12/2014
CN 107690303 A 2/2018
(Continued)

OTHER PUBLICATIONS

India Intellectual Property Office, First Examination Report, Indian Patent Application No. 202117039785, 6 pages, Apr. 8, 2022.
(Continued)

*Primary Examiner* — Anh-Tuan V Nguyen
(74) *Attorney, Agent, or Firm* — Thompson Hine LLP

(57) ABSTRACT

Various implementations disclosed herein include devices, systems, and methods that facilitate the creation of a 3D model for object detection based on a scan of the object. Some implementations provide a user interface that a user interacts with to facilitate a scan of an object to create 3D model of the object for later object detection. The user interface may include an indicator that provides visual or audible feedback to the user indicating the direction that the capturing device is facing relative to the object being scanned. The direction of the capture device may be identified using sensors on the device (e.g., inertial measurement unit (IMU), gyroscope, etc.) or other techniques (e.g., visual inertial odometry (VIO)) and based on the user positioning the device so that the object is in view.

22 Claims, 12 Drawing Sheets

Related U.S. Application Data

(60) Provisional application No. 62/978,391, filed on Feb. 19, 2020, provisional application No. 62/879,759, filed on Jul. 29, 2019.

(51) Int. Cl.
  G06V 20/10 (2022.01)
  H04N 23/60 (2023.01)
  H04N 23/63 (2023.01)

(52) U.S. Cl.
  CPC .......... H04N 23/635 (2023.01); H04N 23/64 (2023.01); *G06T 2200/08* (2013.01)

(56) References Cited

U.S. PATENT DOCUMENTS

| | | | |
|---|---|---|---|
| 9,367,742 B2 | 6/2016 | Lee et al. | |
| 9,392,263 B2 | 7/2016 | Imai | |
| 9,437,033 B2 | 9/2016 | Sun et al. | |
| 2004/0155877 A1* | 8/2004 | Hong | G06T 7/11 345/419 |
| 2004/0247174 A1 | 12/2004 | Lyons et al. | |
| 2007/0058717 A1* | 3/2007 | Chosak | G06T 7/246 375/240.26 |
| 2014/0125768 A1 | 5/2014 | Bell et al. | |
| 2014/0153751 A1* | 6/2014 | Wells | H04S 7/304 381/74 |
| 2014/0368620 A1* | 12/2014 | Li | G06T 19/006 348/50 |
| 2015/0117784 A1* | 4/2015 | Lin | G06T 11/60 382/195 |
| 2016/0005211 A1* | 1/2016 | Sarkis | G06T 1/0007 345/419 |
| 2017/0064200 A1* | 3/2017 | Castillo | G06T 17/00 |
| 2017/0091988 A1 | 3/2017 | Motta et al. | |
| 2017/0193693 A1* | 7/2017 | Robert | G01B 11/24 |
| 2018/0061120 A1* | 3/2018 | Short | A61B 5/0033 |
| 2018/0103209 A1* | 4/2018 | Fischler | H04N 23/64 |
| 2018/0367732 A1* | 12/2018 | Baldwin | H04N 23/632 |
| 2019/0122425 A1 | 4/2019 | Sheffield | |
| 2019/0253614 A1* | 8/2019 | Oleson | H04N 23/62 |
| 2019/0378326 A1* | 12/2019 | Ito | G06T 17/00 |
| 2022/0373685 A1* | 11/2022 | Dold | G01S 17/89 |

FOREIGN PATENT DOCUMENTS

| | | |
|---|---|---|
| CN | 109792488 A | 5/2019 |
| WO | 2019/083832 A1 | 2/2019 |

OTHER PUBLICATIONS

European Patent Office (ISA/EP), International Search Report and Written Opinion of the International Searching Authority, International Application No. PCT/US2020/043358, 13 pages, Nov. 3, 2020.

"3DFLOW 3DF ZEPHYR User Manual—Free/Lite/Pro/Aerial Version—3DF Zephyr 3.3," by 3Dflow Srl., 84 pages, 2013 Retrieved from the internet on Oct. 26, 2020: https://web.archive.org/web/20171013132207if_/http://3dflow.net:80/zephyr-doc/3OF%20Zephyr%20Manual/203.300%20English.pdf.

"NVIDIA's Photogrammetry Visualizer Gives Live Feedback in the Field," SPAR3D, 4 pages, 2017 Retrieved form the internet on Oct. 26, 2020: https://www.spar3d.com/blogs/the-other-dimension/nvidias-photogrammetry-visualizer-gives-live-feedback-field/.

"Tutorial: Meshroom for Beginners," (Sections entitled "Step 4—Visualize and Export the results" and "Step 8—Working Iteratively"), SKETCHFAB, 22 pages, 2019 Retrieved from the internet on Oct. 26, 2020: https://sketchfab.com/blogs/community/tutorial-meshroom-for-beginners/.

China National Intellectual Property Administration, Chinese Office Action issued Dec. 8, 2023, which pertains to Chinese Patent Application No. 202080021503.0. 6 pages.

China National Intellectual Property Administration, 2nd Chinese Office Action issued Apr. 25, 2024, [w/English Translation], which pertains to Chinese Patent Application No. 202080021503.0. 11 pgs.

* cited by examiner

OBJECT SCANNING FOR SUBSEQUENT OBJECT DETECTION

TECHNICAL FIELD

The present disclosure generally relates to systems, devices, and methods for scanning physical objects to facilitate detecting and tracking those objects in images and video.

BACKGROUND

Objects can be detected in images or video using various techniques. Some object detection techniques are based on prior scans of an object that generate a model or other information about the object. Once a user has generated such a model or other information for an object, the model or other information can be compared with later obtained images and video to identify the object in those images and video. For example, a user may perform a scan of a statue to generate a 3D model of the statue. Other users may then walk around a museum that houses the statue capturing images or video using a mobile phone or other device and the 3D model may be used to detect the presence and position of the statue in those images and video.

Existing techniques for capturing scans that can later be used for object detection may have certain disadvantages. For example, such techniques may require the user to scan the object to capture video or images of the object from multiple directions but may not adequately guide the user to efficiently and easily obtain such a scan. The user may have difficulty knowing whether he or she has scanned the object from sufficient directions or how to move the camera to obtain additional needed images. Existing techniques may also require manual identification of the object in images or 3D representations of the object. For example, a user may be asked to position a 3D bounding box that roughly estimates the location and extent of the object. The system may use this 3D bounding box to restrict the detected key points that will be attributed to the object, e.g., allowing the system to ignore key points detected on the nearby table surface or from nearby objects, to provide an accurate 3D model of the object. Positioning such a 3D bounding box may be difficult for a user, especially for a user who attempts to do so using a 2D display and interface. For these and other reasons, existing techniques for capturing scans that can later be used for object detection may be burdensome on the user and may not adequately facilitate distinguishing the object from other elements of the physical setting.

SUMMARY

Various implementations disclosed herein include devices, systems, and methods that facilitate the creation of a 3D model for object detection based on a scan of the object. Some implementations provide a user interface that a user interacts with to facilitate a scan of an object to create a 3D model of the object for later object detection. The user interface may include an indicator that provides visual or audible feedback to the user indicating the direction that the capturing device is facing relative to the object being scanned. The direction of the capture device may be detected using sensors on the device (e.g., inertial measurement unit (IMU), gyroscope, etc.) or other techniques (e.g., visual inertial odometry (VIO)). The direction of the capture device relative to the object in the physical setting may be detected based on detecting a change in the direction of the device in a coordinate system of the physical setting.

As the user walks or otherwise moves the device around the object with the device's camera facing the object, the indicator shows or tells the user the current camera direction. In some implementations, images from the device's camera are presented on a portion of the display, e.g., as live video, and the indicator is presented on multiple sides of the displayed camera content, e.g., as a ring around the live video images from the device's camera. Elements of such an indicator may change in appearance to indicate the current direction of the camera relative to the object. For example, a user may hold the device to view an image of an object within an elliptical indicator on the device's display. A portion of the indicator, e.g., elements on one side of the indicator and thus one side of the object, may have an appearance (e.g., enlarged, colored red, etc.) that indicates the current camera direction. When the user moves the device to the opposite side of the objects and again holds the device to view another image of the object within the elliptical indicator on the device's display, a different portion of the indicator (e.g., elements on the opposite side of the indicator and thus the opposite side of the object, may be given the appearance (e.g., enlarged, colored red, etc.) that indicate the current camera direction.

Such user interfaces with indicators indicating camera direction provide useful feedback to a user during an object scanning process. During such a scanning process, the user may move the device around the object to view the object from different directions and may select to create image captures at certain instances from certain directions. When such "captures" are identified by the user, the indicator may change in appearance to indicate that the user has created the captures from the respective camera directions. For example, indicator elements may change in appearance, e.g., to a permanent state, to reflect that captures of the object have been initiated by the user. For example, the user may make a first image capture from the front side of the object and elements on the bottom of the indicator may turn permanently yellow, then make a second image capture from the left side of the object and elements on the left side of the indicator may turn permanently yellow, then make a third image capture from the back side of the object and elements on the top of the indicator may turn permanently yellow, then make a fourth image capture from the right side of the object and elements on the right side of the indicator may turn permanently yellow. The user is able to easily visualize from which directions images of the object have been captured, which directions remain uncaptured, and to also see the device's current direction. Once the user has captured sufficient image captures from sufficient directions, a 3D model of the object may be automatically generated for use in subsequent object detections. The user interface may include additional facilitating features (e.g., guiding the user to also obtain top down or bottom up images) as described herein and as otherwise appropriate given a particular implementation.

Some implementations of this disclosure involve, on a computing device having a processor, a memory, and an image sensor, performing various operations to facilitate the creation of a 3D model for object detection based on a scan of the object. An exemplary method involves providing, in a user interface, an indicator indicating possible directions from which images of an object in a physical setting may be captured. The method modifies the indicator based on a direction of the device (e.g., the device's camera) relative to the object. Thus, for example, the user interface may provide a graphical indicator that is a circle of dashes displayed around content captured by the device's camera. As the user moves the device around the object and based on the current orientation of the device and the resulting direction of the device relative to the object, different dashes around the circle may be changed in shape, size, or color to indicate the device's current direction relative to the object. The method captures images of the object from a plurality of directions, for example, automatically and/or based on user input creating such captures, and generates a model of the object (e.g., a feature point cloud) for detection of the object in subsequent images.

Some implementations of this disclosure involve, on a computing device having a processor, a memory, and an image sensor, performing various operations to facilitate identification of an object during the creation of a 3D model for object detection based on a scan of the object. In some implementations, a model of an object is generated based on the user identifying user-captured images that are used to distinguish the object from other items in the images that would otherwise become part of the 3D model. An exemplary method records images of an object from a plurality of directions. Such images may be recorded continuously, e.g., as video. The method identifies a subset of the images as user-captured images during the recording of the images. For example, the user may select a user interface command (e.g., a capture button) at certain instants in time as the user moves around the object. For example, 10 images of the 200 recorded images may be identified as user-captured images.

The method generates a model (e.g., a feature point cloud) based on the images of the object (e.g., using all 200 images). Generating the model may involve distinguishing the object from nearby items. Accordingly, the method may identify a portion of the model corresponding to the object based on the images, e.g., using the subset of user-captured images. In some implementations, each of the user-captured images created based on the user input (e.g., when the user selects the capture button) is associated with a volume of space (e.g., a cone of space associated with the image captured during the time). In some implementations, the user captures these user-captured images with the object displayed entirely within a boundary (e.g., within a circular graphical indicator) on the display. The method may identify a volume of space (e.g., a cone) associated with each capture and distinguish the object from other items based on the understanding that the object is within those volumes of space. As the user captures user-captured images (e.g., selecting the capture button) from different directions, multiple volumes are identified. The object's location may be determined and distinguished from other items in the physical setting based on the intersection of those volumes (e.g., within the intersection of multiple cones). Moreover, the model may be generated on an ongoing basis and each capture may be used to clip off portions of the model outside the volume of space associated with the capture. During the course of a scan from multiple directions, the model of the object may be appropriately limited to include only the object and to exclude other items that might otherwise have been included in the model.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, an image sensor, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
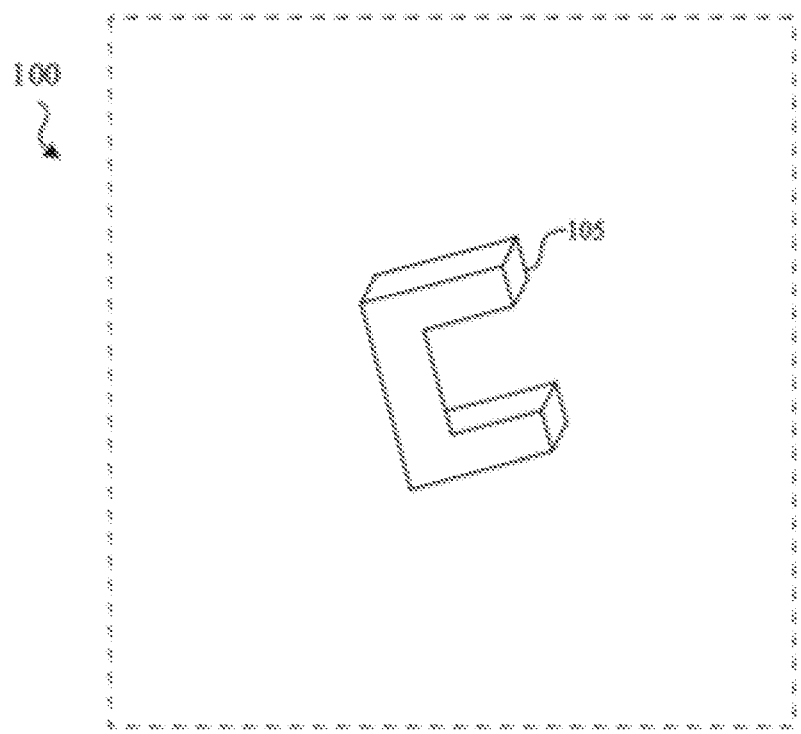
FIG. 1 illustrates an example physical object in a physical setting in accordance with some implementations.

In accordance with common practice the various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram depicting an example of a physical object 105 in a physical setting 100. While this example and other examples discussed herein illustrate a 3D model of a single object 105, the techniques disclosed herein are applicable to multiple objects.

The phrase "physical setting" refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

The phrase "physical object" as used herein refers to any type of item or combination of items in a physical setting including, but not limited to, building blocks, a toy, a statue, furniture, a door, a building, a picture, a painting, a sculpture, a light fixture, a sign, a table, a floor, a wall, a desk, a body of water, a human face, a human hand, human hair, another human body part, an entire human body, an animal or other living organism, clothing, a sheet of paper, a magazine, a book, a vehicle, a machine or other man-made object, and any other natural or man-made item or group of items present in the physical setting that can be identified and modeled.

Figure 2:
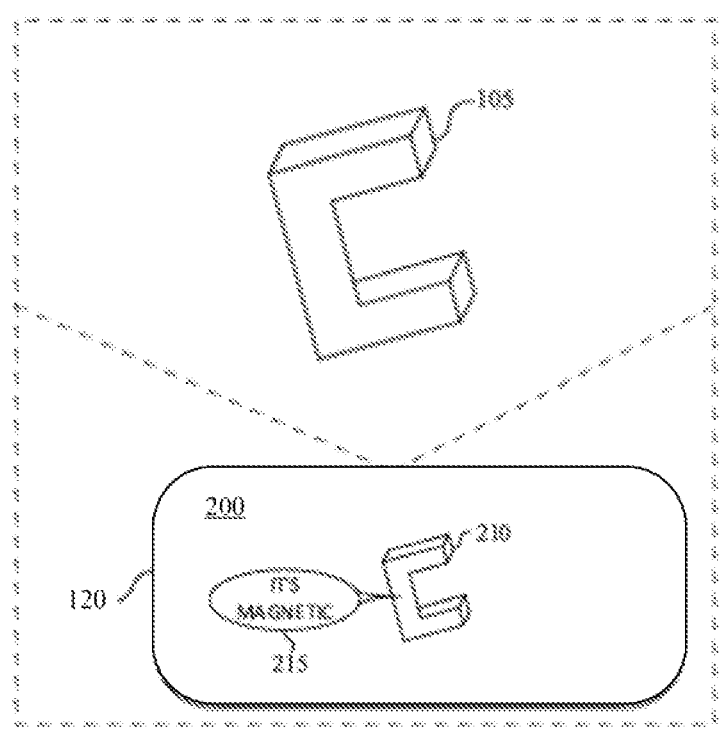
FIG. 2 illustrates a mobile device displaying an enhanced reality (ER) setting with the example physical object of FIG. 1 in accordance with some implementations.

FIG. 2 is a block diagram of a mobile device 120 displaying an enhanced reality (ER) setting 200 of the example physical object 105 of FIG. 1. An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a hologram or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

In the example of FIG. 2, the device 120 captures one or more images of the physical object 105 and compares those images with a 3D model (e.g., previously captured keyframes, point cloud values, etc.) to detect and track the presence of the physical object 105. The device 120 can determine the pose (e.g., position and orientation) of the physical object 105, for example, using RGB-D information, infrared-camera-based depth detection, and other such techniques. Thus, after detecting the physical object and determining its pose, the device 120 can align its 3D model of the object with the physical object in a coordinate system corresponding to physical space of the physical setting.

Given this alignment, the device is able to provide an ER setting 200 that combines aspects of the physical setting with augmented content. In this example, the ER setting 200 includes a depiction 210 of the physical object 105 and augmented content 215, which includes a text bubble and text phrase "IT'S MAGNETIC." The augmented content 215 is positioned relative to the depiction 210 of the physical object 105 based on the alignment of the physical object 105 with the 3D model. For example, the ER setting 200 creator may have specified that the augmented content 215 is to be displayed at a location that is determined based on a fixed point at the center of the surface of the 3D model of the physical object 105. Once the 3D model is aligned with the physical object 105, the device 120 determines an appropriate location for the augmented content 215 and produces the ER setting 200 for display.

Figure 3:
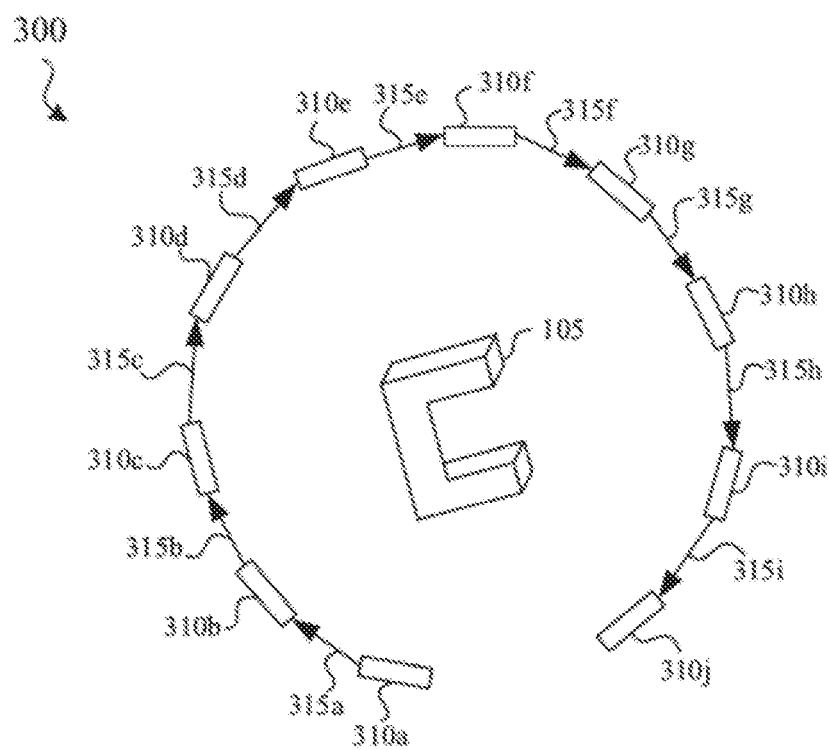
FIG. 3 illustrates a scan of the example physical object of FIG. 1, in accordance with some implementations.

In FIG. 3, the scan 300 includes a scan taken while a device (e.g., device 120 of FIG. 2) is moved along a path 315a-i while capturing images of the physical object 105. The path 315a-i includes the device at a plurality of image sensor poses 310a, 310b, 310c, 310d, 310e, 310f, 310g, 310i, 310j, from initial pose 310a at which image recording begins to final pose 310j at which recording concludes. During the scan 300, the device can track its own pose (e.g., tracking position and orientation changes via one or more movement sensors on the device, inertial data, etc.). Thus, the relative positions of the data in a first 3D coordinate system for images captured at each of the poses 310a, 310b, 310c, 310d, 310e, 310f, 310g, 310i, 310j is known. The image data from these images can be combined to generate a 3D model of the physical object, (e.g., the point cloud depicted in FIG. 4) based on these known poses.

Figure 4:
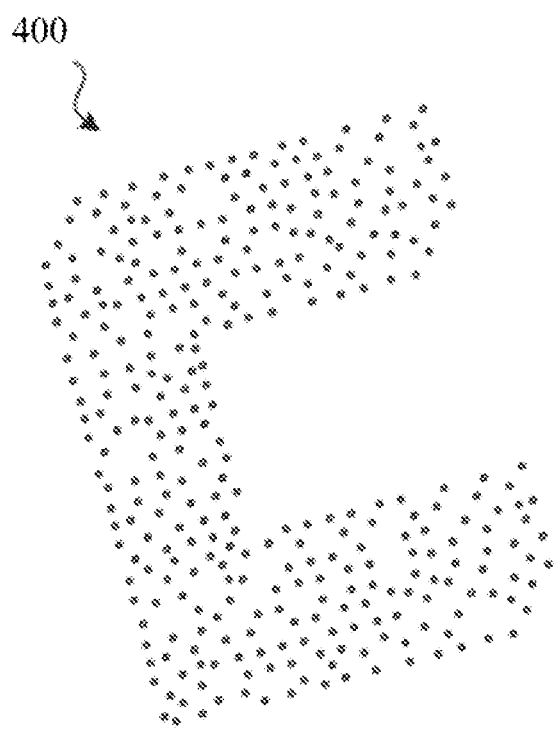
FIG. 4 illustrates an exemplary point cloud generated based on the first scan of FIG. 3, in accordance with some implementations.

FIG. 4 illustrates a 3D model (e.g., an exemplary point cloud) 400 generated from the scan of FIG. 3. The 3D model 400 can include points with descriptors that include color values for points The devices used by the content creator (e.g., for image capture and 3D model creation) and end user(s) (e.g., for object detection using the 3D models) can be any of a variety of devices that include a processor, a non-transitory computer readable medium, and an image sensor. In some implementations, the device is a head-mounted device (HMD) that is worn by the content creator or end user. In some implementations, the device is a handheld electronic device (e.g., a smartphone or a tablet), a laptop, or a desktop computer configured to create 3D models of the physical objects and facilitate the creation of ER settings, e.g., for a content creator, or to present the ER setting to an end user. In some implementations, the device is an ER chamber, enclosure, or room configured to present an ER setting in which an end user does not wear or hold the device.

Figure 5:
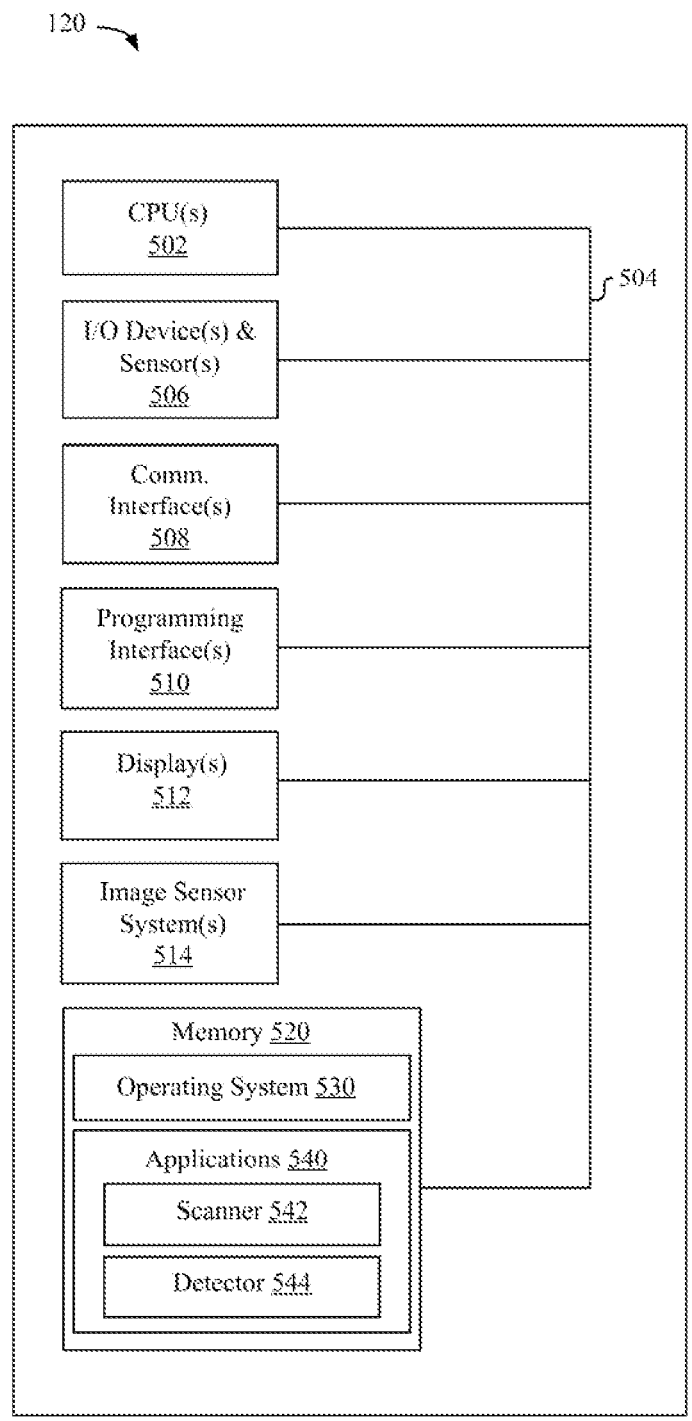
FIG. 5 illustrates exemplary components of a device used to generate 3D models of physical objects and detect the physical objects in accordance with some implementations.

FIG. 5 is block diagram illustrating exemplary components of a device used to generate 3D models of physical objects and detect the physical objects in accordance with some implementations. These functions can be separated onto one or more separate devices in various implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 502 (e.g., microprocessors, ASICs, FPGAs, GPUs, CPUs, processing cores, or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, one or more displays 512, one or more interior or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the device 120 detected by the one or more I/O devices and sensors 506 provides input to the device 120.

In some implementations, the one or more displays 512 are configured to present ER content. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 512 correspond to diffractive, reflective, polarized, holographic, etc. waveguide displays. In one example, the device 120 includes a single display. In another example, the device 120 includes a display for each eye. In some implementations, the one or more displays 512 are capable of presenting ER content.

In some implementations, the one or more image sensor systems 514 are configured to obtain image data that corresponds to at least a portion of a scene local to the device 120. The one or more image sensor systems 514 can include one or more RGB cameras (e.g., with a complimentary metal-oxide-semiconductor (CMOS) image sensor or a charge-coupled device (CCD) image sensor), RGB-D cameras, monochrome cameras, IR cameras, event-based cameras, or the like. In various implementations, the one or more image sensor systems 514 further include illumination sources that emit light, such as a flash.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and one or more applications 540.

The operating system 530 includes procedures for handling various basic system services and for performing hardware dependent tasks. In some implementations, the operating system 530 includes built in ER functionality, for example, including an ER setting creation feature or an ER setting viewer that are configured to be called from the one or more applications 540. The applications 540 include a scanner 542 configured to create scans of physical objects and create 3D models of the physical objects based on the scans. The applications 540 also include a detector 544 configured to use these 3D models to detect the physical objects in later-obtained images, e.g., during an ER setting.

FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 6:
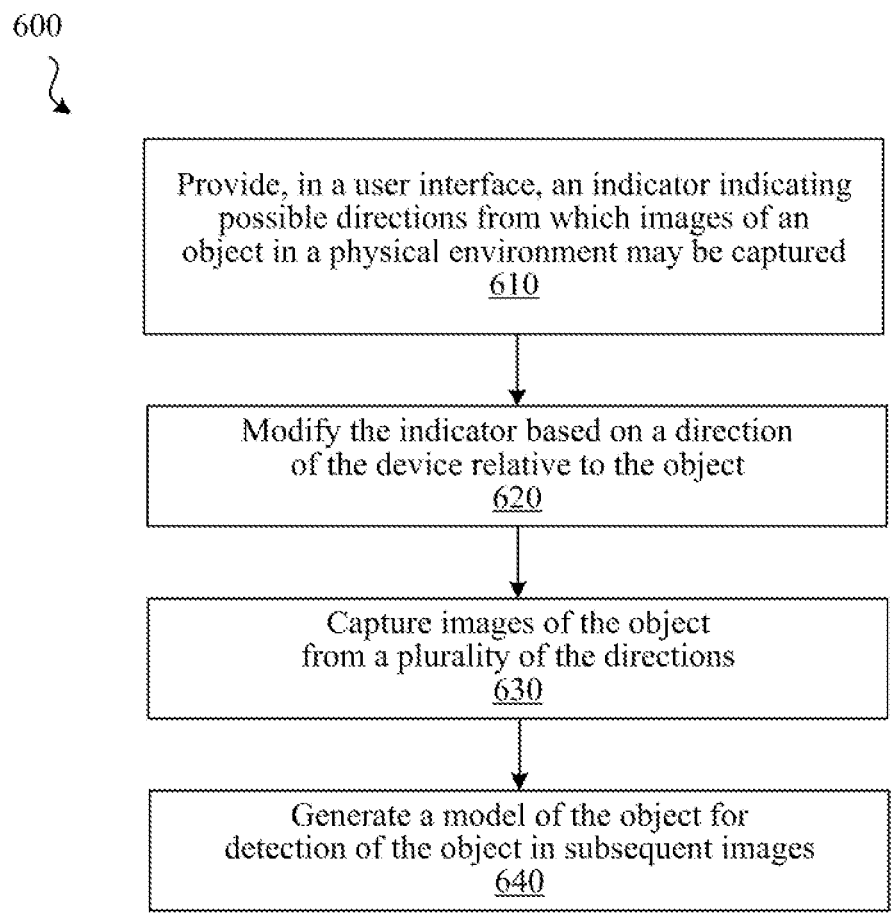
FIG. 6 is a flowchart representation of a method for creating a model of an object in accordance with some implementations.

FIG. 6 is a flowchart representation of a method for creating a model of an object in accordance with some implementations. In some implementations, the method 600 is performed by a device (e.g., device 120 of FIGS. 2 and 5). The method 600 can be performed at a mobile device, HMD, desktop, laptop, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 provides, in a user interface, an indicator indicating possible directions from which images of an object in a physical setting may be captured. In some implementations, the indicator is a ring of elements (e.g., dashes) displayed around live images captured by a sensor on the user's device. In some implementations, the indicator is a ring of dashes that are oriented radially outward from a center of the ring. In some implementations, the indicator indicates possible directions that are perpendicular to a gravitational direction identified using a sensor on the device.

In some implementations, the method 600 captures and/or records live images of the physical setting and displays a portion (e.g., some or all pixels) of those images on the user's device. In some implementations, only a subset of pixels of each images associated with a region within the indicator (e.g., within the ring of elements of an indicator) are displayed. Other portions of the images may be clipped. In some implementations, an indicator is displayed on top of the images from device, e.g., a ring of dashes may be displayed on top of each image indicating that the relevant portion of each image is the portion within the indicator.

At block 620, the method 600 modifies the indicator based on a direction of the device (e.g., the device's camera) relative to the object. Thus, for example, the user interface may provide a graphical indicator that is a circle of dashes displayed around content captured by the device's camera. As the user moves the device around the object and based on the current orientation of the device and the resulting direction of the device relative to the object, different dashes around the circle may be changed in shape, size, or color to indicate the device's current direction relative to the object. In some implementations, the indicator is modified by changing a size, shape, or color of a subset of elements to indicate the direction of the device. For example, elements of the indicator may have a normal size, shape, and color with the exception of elements of the indicator on the relevant side associated with the device's current direction. In some implementations, an indicator is modified by changing the size, shape, or color of a first subset of the elements from a first state (e.g., normal) to a second state (e.g., enlarged) to indicate the current direction of the device and returning the size, shape, or color of a second subset of the elements from the second state (e.g., enlarged) to a second state (e.g., normal) to indicate that the device is no longer oriented in a prior direction. In some implementations, the indicator includes radially-oriented elements and modifying the indicator involves changing a length, thickness, or color of a subset of those elements to indicate the direction of the device.

Note that the method 600 does not need to actually determine (e.g., via computer vision) that the device is on a particular side of the object. Instead, the method 600 can rely on the user putting the object in the camera's current view and the direction of the device as determined, for example, based on sensors on the device.

In some implementations, the direction of the device relative to the object in the physical setting is detected based on detecting a change in the direction of the device in a coordinate system of the physical setting. In some implementations, the direction of the device relative to the object in the physical setting based on motion data from a motion sensor on the device indicating a change in position or orientation of the device in the physical setting.

At block 630, the method 600 captures images of the object from a plurality of the directions. Such images may be recorded, for example, automatically and/or based on user input creating such captures. In some implementations, all of the recorded images will be used to generate the model of the object. In other implementations, only a subset of the images (e.g., only user captured images) will be used to generate the model. In some implementations, images are continuously recorded and subset of those images are identified based on user input as user captured images.

The identification of some images as user captured images may be used to change the appearance of the indicator. For example, creating a permanent (e.g., for the remainder of the current scan) change to the color, shape, or size of the indicator to indicate that the user has initiated a user capture image from one or more particular directions. In some implementation, the method receives input to capture an image as a user captured image and modifies the indicator based on the direction of the device relative to the object when the input is received. In some implementations, modifications of the indicator based on input to capture images are persistent during a scan of the object. For example, indicator elements may be changed to be thicker and yellow in color and remain thick and yellow even when the user subsequently moves to another side of the object and changes the direction of the device.

In some implementations, the method 600 guides the user to provide additional information for the model to be generated. For example, the method 600 may request that the user obtain a top-down image of the object, obtain a bottom up image of the object, etc.

At block 640, the method 600 generates a model of the object for detection of the object in subsequent images. The 3D model may be a point cloud of points associated with descriptors. The point cloud may include points having descriptors based on the scan data. All of the images or a subset of the images (e.g., only the user captured images) may be used to distinguish the object from other items in the physical setting that should not be included in the model.

In some implementations, at the start of a scanning operation, a device or method present a user interface in which a camera feed displayed with a capture button. The device or methods visually or audibly instructs or asks the user to take a picture from/of the front of the object. The user points the camera at the front of the object and presses the capture button. This along with the gravity from the IMU is used to orient the coordinate system for the scan. The device or method presents an indicator that has dashes to indicate device direction. For example, the indicator (e.g., its shape, perimeter, etc.) may identify the coverage that the current image has of the object. The size, shape, color, or other attribute of the indicator may indicate the current direction of the device. As the user moves the device around the object and based on the orientation of the capture device and the resulting direction of the device relative to the object, different dashes around the circle may be modified (e.g., enlarged or reduced in size) to indicate the device's current direction relative to the object.

When the user hits the capture button again, the modifications to the indicator elements (e.g., the thicker dashed lines associated with the current device direction) may be change color and be permanently in the modified (e.g., thicker) state. This lets the user know that a particular side of the object has been scanned and that the user can focus on scanning other parts or sides of the object. The user continues to move around the object and hitting the capture button until the dashes on the ring are all permanently modified (e.g., thick and a different color). Finally, the user may be asked to take a picture of the object from a top-down view. The images of the object from the scan and top-down view (and any other relevant information obtained during the process) may then be used to generate the model of the object. Note that 100% coverage (e.g., all thicker colored dashes) may not be required for the process to work, but may be used as a threshold to provide a model having at least a threshold quality. Lower quality models may be obtained without all of the desired images.

Figure 7:
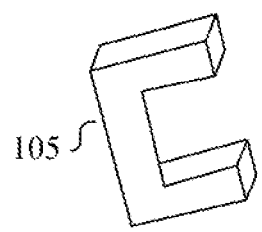
FIG. 7 illustrates a direction of a device relative to an object at a first instance during the scan of object of FIG. 3.
Figure 7:

FIG. 7 illustrates a direction of a device relative to an object 105 at a first instance during the scan of object of FIG. 3. In this example, the device has an image sensor pose 310*a* that is in front of the object 105. In pose 310*a*, the device is oriented towards the front of object 105. Alternatively, the device can also be described as being directed towards the front of object 105.

Figure 8:
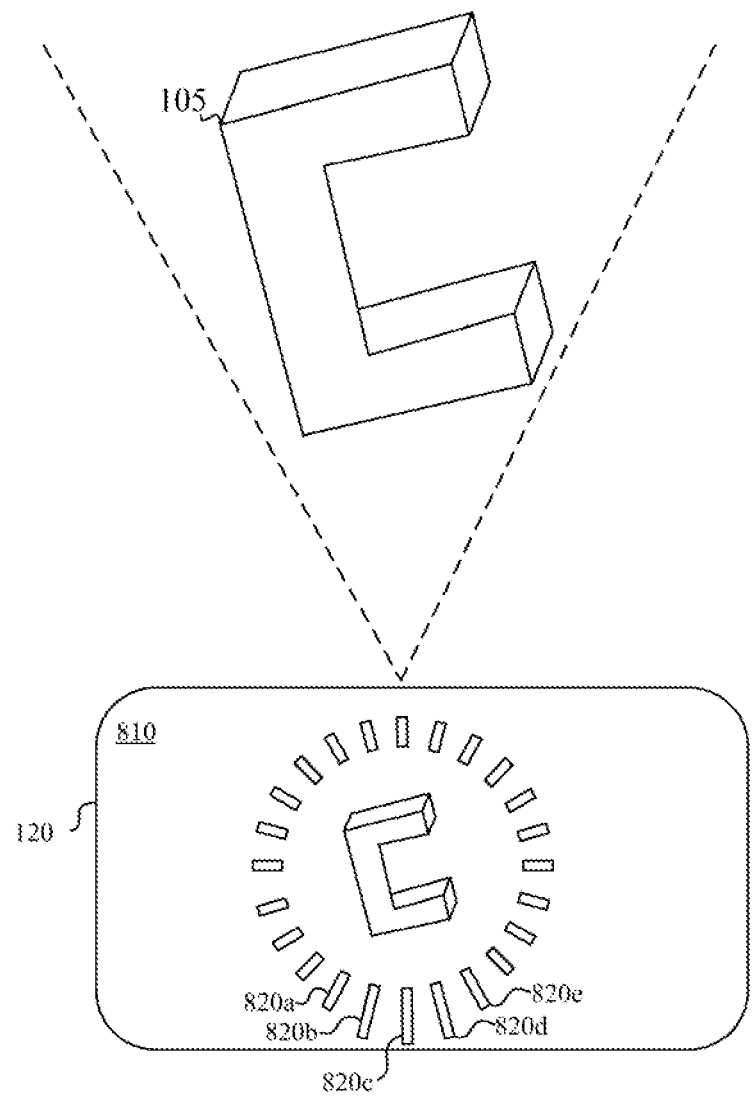
FIG. 8 illustrates an indicator displayed to indicate the direction of the device during the first instance depicted in FIG. 7 in accordance with some implementations.

FIG. 8 illustrates an indicator displayed to indicate the direction of the device 120 relative to object 105 during the first instance depicted in FIG. 7. The indicator includes elements, e.g., elements 820*a-e*, that are displayed surrounding the depiction of the object. In this example, indicator elements 820*a-e* are enlarged to indicate that the device has a direction towards the front of the object 105. In some implementations, the initial direction of the device at the beginning of a scan is associated with particular indicator elements and associated direction (e.g., the initial direction may be assumed to be the front and indicated with the bottom elements of the indicator).

In addition, multiple indicator elements may be used to indicate a particular direction. For example, as illustrated in FIG. 8, one indicator (820c) may indicate the direction of the device while additional nearby indicators indicate that the device's current direction is also sufficient to obtain information associated with images from other directions (e.g., 820a, b, d, e). In some implementations, the multiple indicator element modifications are provided to make the indicator modification easier to comprehend. In some implementations, the multiple indicator element modifications indicate that a current image will provide image capture data relevant to multiple camera directions and thus that recording images from those other (nearby) directions is not required to generate a model of the object.

Figure 9:
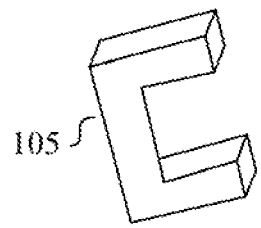
FIG. 9 illustrates a direction of a device relative to an object at a later instance during the scan of object of FIG. 3.
Figure 10:
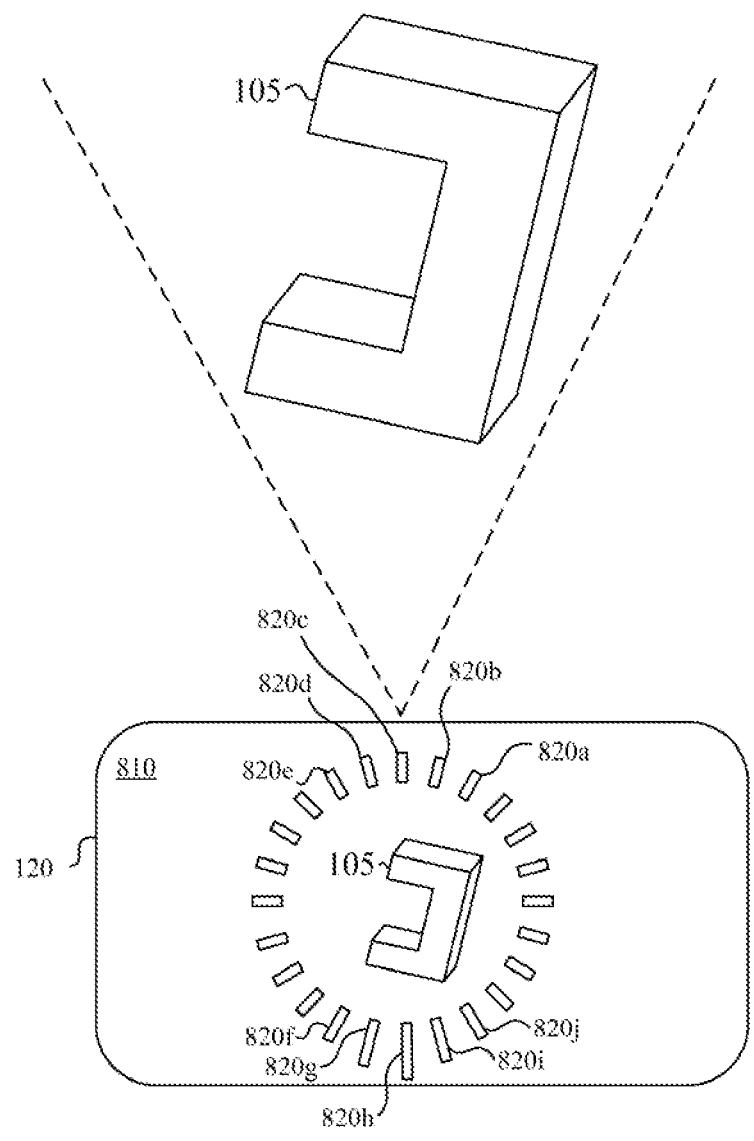
FIG. 10 illustrates an indicator displayed to indicate the direction of the device during the later instance depicted in FIG. 9 in accordance with some implementations.

FIG. 9 illustrates a direction of the device relative to the object 105 at a later instance during the scan of object of FIG. 3. In this example, the device has an image sensor pose 310f that is behind the object 105. FIG. 10 illustrates the indicator displayed to indicate the direction of the device during the later instance depicted in FIG. 9. The indicator still includes elements, e.g., elements 820a-e and 820f-j), that are displayed surrounding the depiction of the object. In this example, indicator elements 820f-j are enlarged to indicate that the device has a direction facing a rear side of the object 105 and the indicator elements 820a-e are reduced in size to indicate that the device no longer has the direction of FIGS. 7-8.

Figure 11:
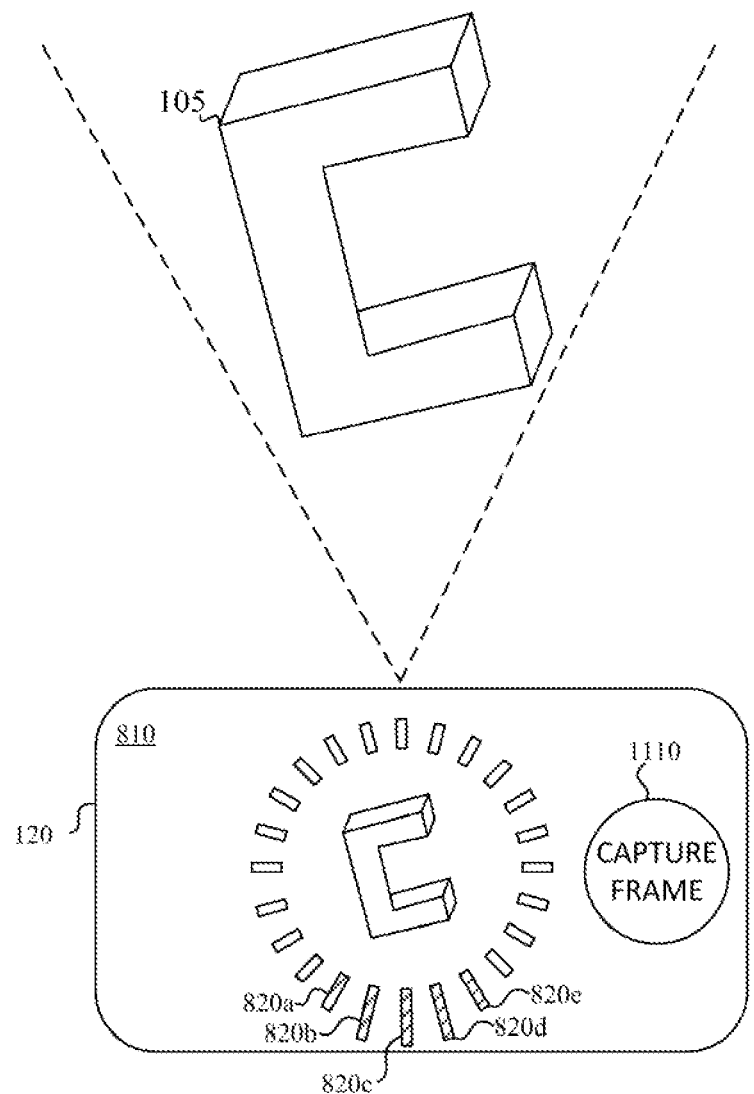
FIG. 11 illustrates an indicator displayed to indicate that a user captured image was captured from a direction in accordance with some implementations.

FIG. 11 illustrates an indicator displayed to indicate that a user captured image was captured from a direction. In this example, the user has provided user input to capture a user-captured image while the device had image sensor pose 310a is in front of the object 105 (e.g., as illustrated in FIG. 7). In this example, indicator elements 820a-e are enlarged to indicate that the device has a direction towards the front of the object 105 and the indicator elements have a modified color (e.g., turning from red to yellow) to indicate that the user has captured a user-captured image from this direction. These modifications may be made permanent (e.g., for the remainder of the scan) based on the user input to capture the user-captured image.

Figure 12:
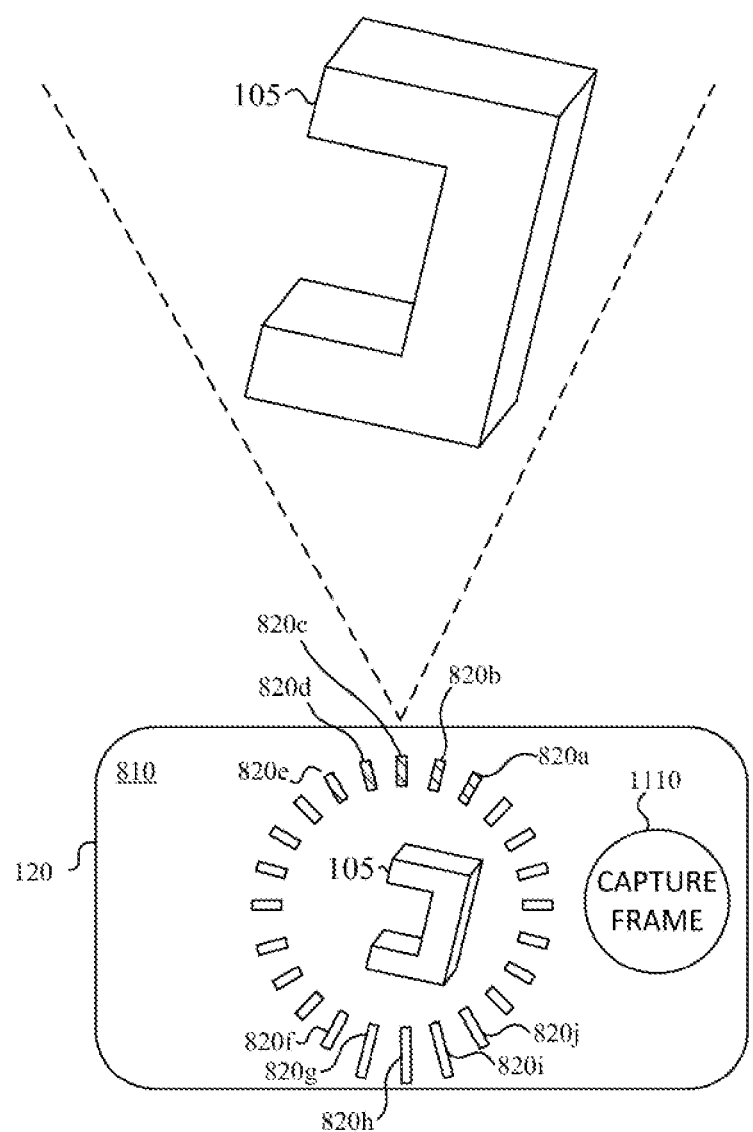
FIG. 12 illustrates an indicator displayed with a permanent modification to indicate that a user captured image was previously captured from a direction in accordance with some implementations.

FIG. 12 illustrates the indicator displayed with modification to indicate that a user captured image was previously captured from a direction. Following the user capture of the user-capture image of FIG. 11, the user moves the device to image sensor pose 310j behind the object 105 (e.g., as illustrated in FIG. 9). In this example, indicator elements 820f-j are enlarged to indicate that the device has a direction towards a rear side of the object 105. In this example, indicator elements 820a-e continue to have the new color (e.g., yellow) indicating that the user previously captured a user-captured image from the direction associated with indicator elements 820a-e.

Figure 13:
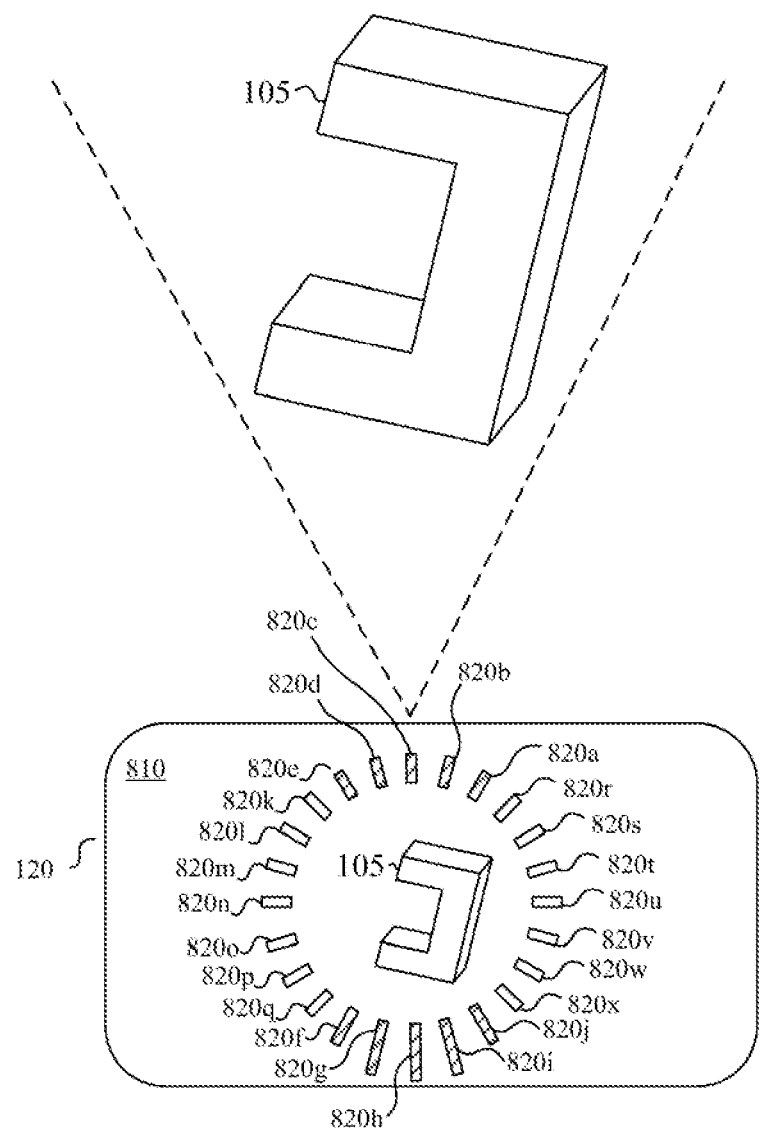
FIG. 13 illustrates an indicator displayed to indicate that multiple user captured images were captured from multiple directions in accordance with some implementations.

FIG. 13 illustrates the indicator displayed to indicate that multiple user captured images were captured from multiple directions. In this example, the user captured images from the directions associated with indicator elements 820a-j as indicated by the permanent color of those indicator elements. Moreover, the remaining indicator elements 820k-x remain in a normal state, indicating that the user should continue to scan the object from additional directions to obtain the images of the object needed (or otherwise determined appropriate) for creating the 3D model. The user can use this visual feedback from the indicator elements 820a-x to continue scanning the object 105 to visualize directions that have already been captured, directions that still need to be captured, and the device's current direction. In some examples, the user can continue scanning the object until all of the indicator elements are changed to indicate that the object has been recorded from images from sufficient surrounding directions. In some examples, the user can continue identifying user-initiated image captures until all of the indicator elements are changed to indicate that the object has been recorded from images from sufficient surrounding directions.

Figure 14:
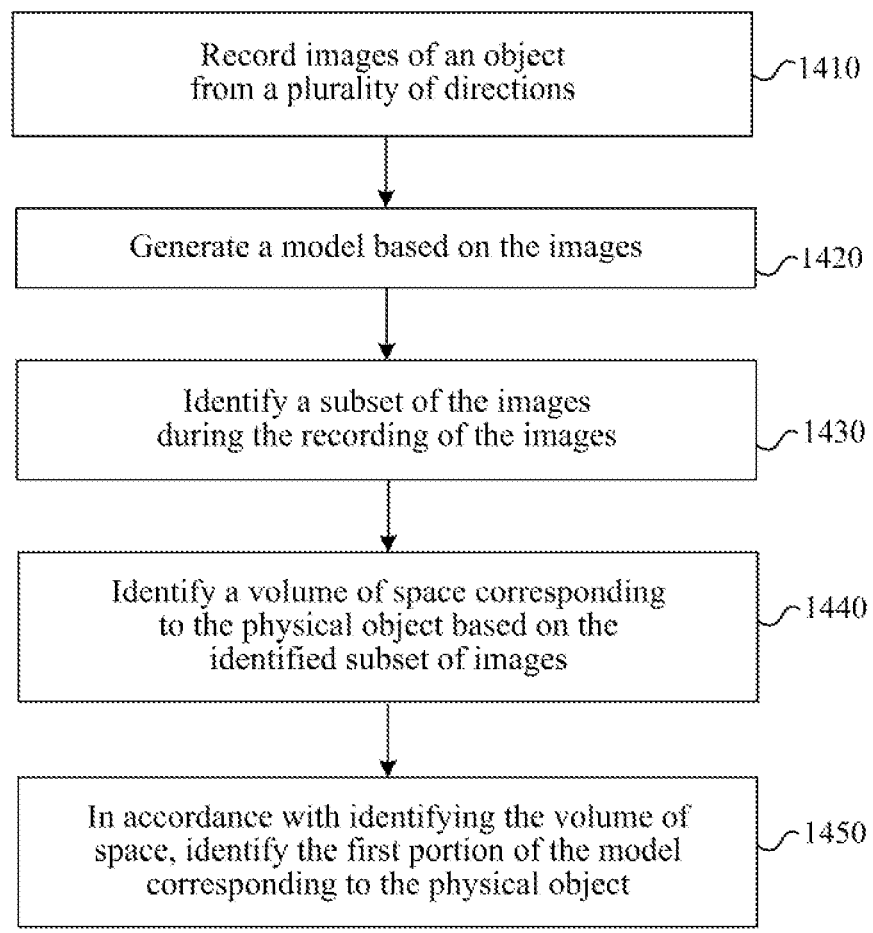
FIG. 14 is a flowchart representation of a method for facilitating identification of an object during the creation of a 3D model for object detection based on a scan of the object in accordance with some implementations.

FIG. 14 is a flowchart representation of a method for facilitating identification of an object during the creation of a 3D model for object detection based on a scan of the object in accordance with some implementations. In some implementations, the method 1400 is performed by a device (e.g., device 120 of FIGS. 2 and 5). The method 1400 can be performed at a mobile device, HMD, desktop, laptop, or server device. In some implementations, the method 1400 is performed by processing logic, including hardware, firmware, software, or a combination thereof. In some implementations, the method 1400 is performed by a processor executing code stored in a non-transitory computer-readable medium (e.g., a memory).

At block 1410, the method 1400 records images of an object from a plurality of directions. Such images may be recorded continuously, e.g., as video. The images include depictions of the physical object and a physical setting of the physical object. For example, the images may include depictions of a physical object and the table or floor upon which the physical object rests, the wall upon which the physical object is leaning, an adjacent physical object, or a nearby physical object.

At block 1420, the method 1400 generates a model (e.g., a feature point cloud) based on the images. The model may include a first portion corresponding to the physical object and a second portion corresponding to the physical setting (e.g., nearby walls, tables, or other physical objects).

At block 1430, the method 1400 identifies a subset of the images during the recording of the images. The subset of the images may be identified based on user input during the recording of the images. For example, as the user moves a device around capturing a stream of images (e.g., video) the user may also periodically press an image capture button to designate the image captured at that point in time as a user-captured image. A user interface may comprise a user interface command (e.g., a capture button) that is initiated at certain instants in time as the user moves around the physical object capturing the images. For example, 10 images of the 200 recorded images may be identified as user-captured images.

A user interface may instruct the user to provide such user input in particular circumstances. For example, the user interface may include an indicator identifying a region (e.g., an elliptical or rectangular graphic identifying a center portion of the display) on a live view of the images being captured and the user may be instructed to provide user input when the object is within the identified region. This may help distinguish images that include the object within the region from images that do not. For example, as the user moves around and captures many images of a physical object, some of those images may not be centered on the physical object, e.g., the physical object may not be entirely depicted within a designated region of the images. The user input may identify images of the images that have depictions of the object within the designated region so that those images may be used to identify the location of the physical object in three-dimensional space.

At block 1440, the method 1400 identifies a volume of space corresponding to the physical object based on the identified subset of the images. In some implementations, this involves identifying an intersection of volumes of space identified based on the subset of the images. For example, a volume of space may be identified based on each of the images in the subset of images, e.g., identifying the volume of space of the physical setting corresponding to a specific region (e.g., within a center rectangle) of each image. The intersection of these volumes of space may be more likely to include the physical object and exclude other physical aspects of the physical setting as compared to other images captured during the recording. The volumes of space may be based on images from a plurality of directions and thus may include boundaries on many or all sides of the physical object that limit the volume of space to a volume that relatively closely approximates the space occupied by the physical object. In some implementations, when a new image is added to the subset of images, the volume of space corresponding to the physical object is updated based on the added image.

At block 1450, in accordance with identifying the volume of space, the method 1400 identifies the first portion of the model corresponding to the physical object. The method 1400 may identify (or clip) a portion of the model corresponding to the object based on the images, e.g., using the volume of space identified based on subset of user-captured images.

In some implementations, each of a subset of the images is associated with a volume of space (e.g., a frustum/cone associated with the image captured during the time). In some implementations, the user captures these user-captured images with the physical object displayed entirely within a region boundary or other indicator (e.g., within a circular graphical indicator) on the display. The method 1400 may identify a volume of space (e.g., a frustum/cone) associated with each capture and distinguish the physical object from other items based on the understanding that the physical object is within those volumes of space. As the user captures user-captured images (e.g., selecting the capture button) from different directions, multiple volumes are identified. The physical object's location may be determined based on the intersection of those volumes (e.g., within the intersection of multiple frustums/cones). Moreover, the model may be generated on an ongoing basis and each user-captured image may be used to clip off portions of the model outside the volume of space associated with the capture. During the course of the scan from multiple directions, it may be appropriate to include only the physical object and to exclude other items that might otherwise have been included in the model.

In some implementations, during a scan, the device or method continuously detects feature points (even when the user is not hitting the capture button). When the user is hitting the capture button, the device or method assesses the view of the camera to carve out a volume in space (e.g., a cone) that contains the physical object. This technique is based on the assumption that when the user presses the capture button, the physical object is in view. The system or method may take the volumes defined by each press of the capture button (around the indicator and top-down) and make determinations distinguishing the physical object from other aspects of the physical setting based on the intersection of those volumes.

Figure 15:
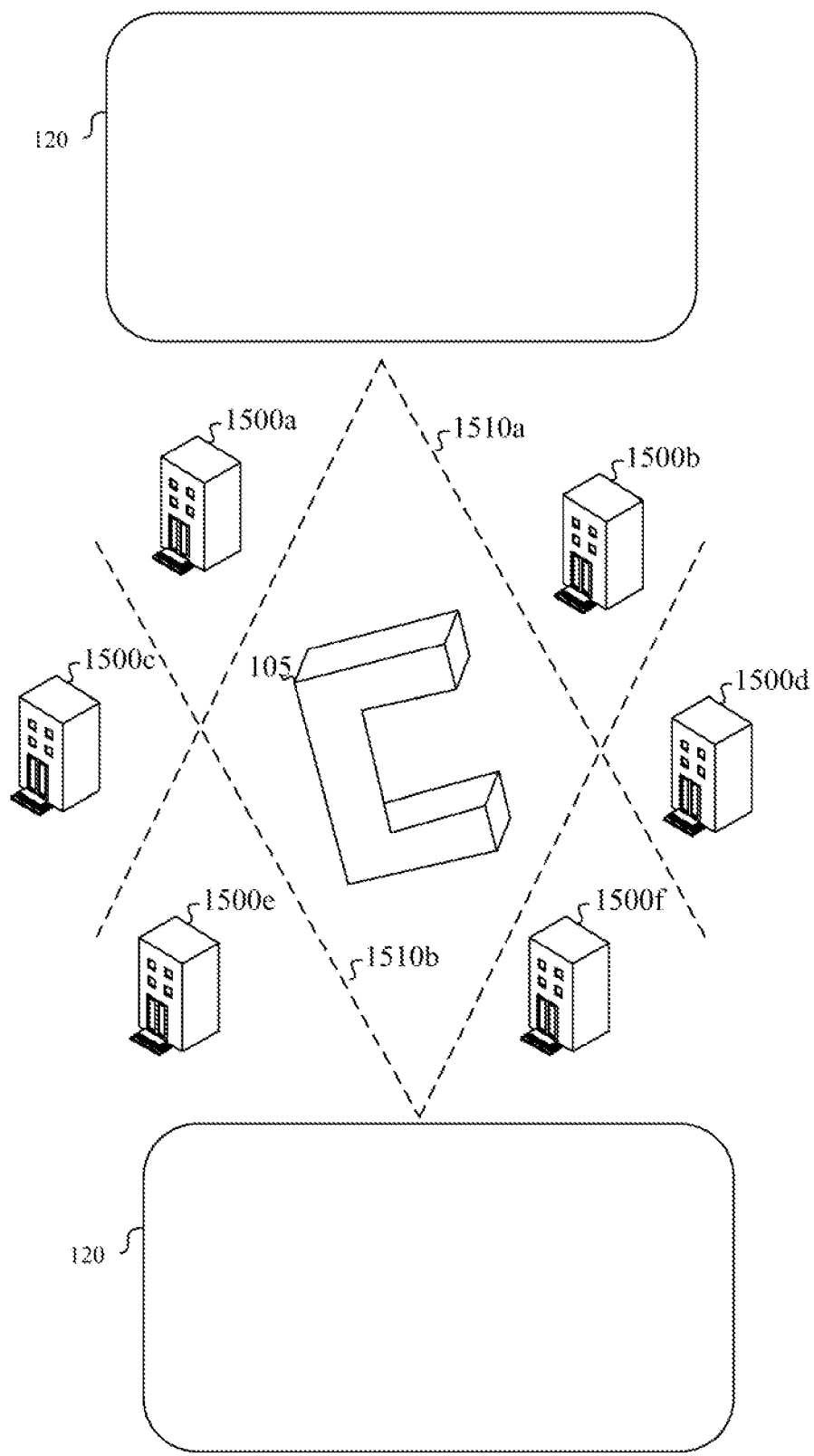
FIG. 15 illustrates clipping a model of an object based on user captured images of the object during a scan in accordance with some implementations.

FIG. 15 is a block diagram illustrating clipping a model of an object based on user captured images of the object during a scan. In this example, the cones or wedges 1510*a-b* associated with two user-captured images are used to determine to include the object 105 in the model while excluding items 1500*a-f*. The intersection of volumes may be used as a bounding volume for the scanned object and used by the model generation unit. The user is not required to position a 3D bounding box. Instead, a bounding area can be automatically created based on the user's selection of user-captured images during the scan process with the object.

The device or method may also use plane detection to detect any type of plane (e.g., horizontal, vertical, angled, etc.) to define a boundary for the scanned object. Feature points on the plane and outside of the bounding volume may not be used to represent the object.

Figure 16:
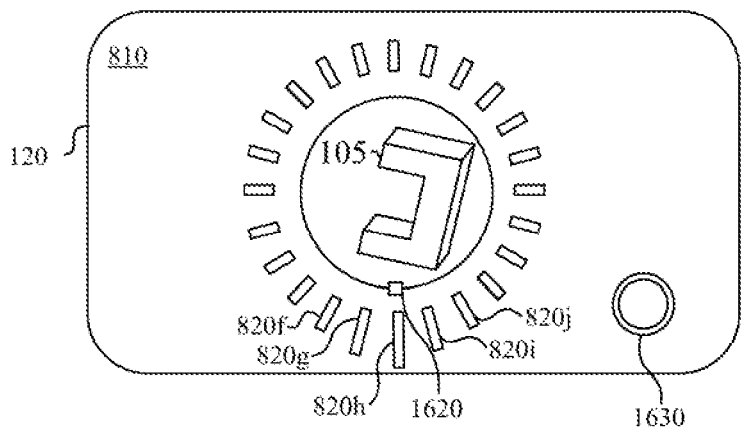
FIG. 16 illustrates user interface features that facilitate an exemplary scanning workflow.

A user interface may be configured to provide instructions, tips, and other guidance to help facilitate the capture of images of an object and good anchor results. A user interface may provide a tip guiding the user to avoid scanning shiny, moving, or tiny objects. A user interface may guide the user to place the object on a flat surface with non-uniform texture. A user interface may guide the user to take about a threshold number (e.g., about 5) photos from different angles As illustrated in FIG. 16, a user interface may provide an indicator 1610 showing the user what will be captured in the scan based on the camera's current image content (e.g., overlaid on current, real time images). The user interface may instruct the user to frame the object using the indicator 1610. The user interface may instruct the user to capture the front of the object.

The user interface may include an indicator, such as indicator 1620, that indicates a particular side (e.g., front of the object). As the user moves around an object capturing images from different positions a object-side indicator such as indicator 1620 may be displayed to help orient the user with respect to the positions of the different sides of the object and/or of which sides the user has already captured images.

A user interface may include a capture button 1630 or other user interface element that receives input to record an image of the object currently displayed. The device may continuously display video capture from the device's camera and may designate certain frames of the video as captured images based on user selection of the capture button 1630.

Figure 17:
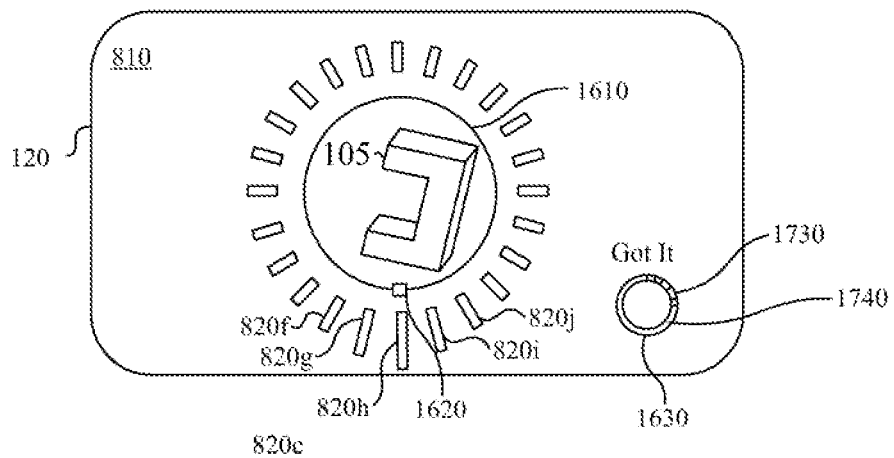
FIG. 17 illustrates user interface features that facilitate an exemplary scanning workflow.

After the user has captured an image of an object from a particular viewpoint, the user interface may change to indicate that an image of the object has been capture. For example, as illustrated in FIG. 17, capture button 1630 is changed such that a portion 1730 of a perimeter 1740 of the capture button 1630 includes an indication (e.g., lines, filled color, etc.) indicating that an image has been captured and a text message "Got It" is displayed. In this example, the portion 1730 corresponds to a percentage (e.g., 25%) of the perimeter 1740 of the capture button 1630 to provide a visual indication that corresponds to a percentage (e.g., 25%) of the images required that have been captured.

Figure 18:
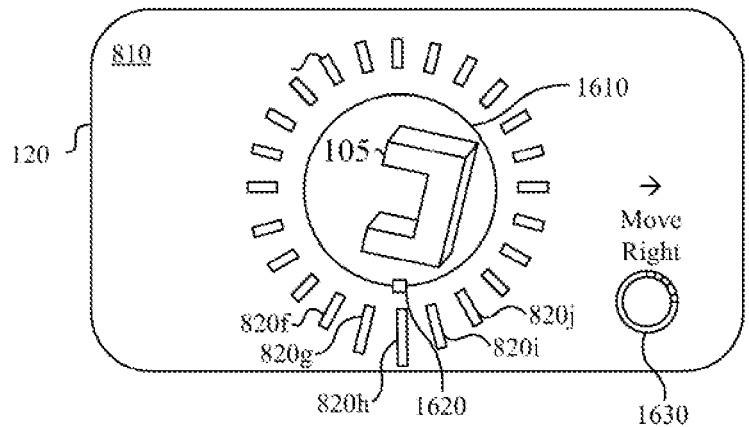
FIG. 18 illustrates user interface features that facilitate an exemplary scanning workflow.

A user interface may provide desired motion indication (e.g., arrow indicator or text) indicating the direction for the user to move the image capture device to capture additional images of the object, as illustrated in FIG. 18.

A user interface may provide guidance or instructions based on detecting motion or changes in motion of the device. For example, based on the user stopping movement for at least a time threshold (e.g., 5-10 seconds), a user interface may provide a message to the user with additional instructions or helpful content.

In another example, once the direction of the device is within range of a desired position for a particular side (e.g., 60-120 degree range for the right side), a user interface may prompt the user to capture an image of the object, e.g., with a message to "Capture right side." If the direction of the device passes the range, the user interface may discontinue showing the message and prompt the user to go back.

After a predetermined number (e.g., three) photos have been taken (e.g., of the front, right side, and back), the user may be given the option to skip obtaining an image from an additional side (e.g., the left side), for example, to accommodate a circumstance in which a user in unable to access or provide parts or view of an object. A user interface may provide a message for the user to skip a step, e.g., a message indicating "Skip Step—Skip this step if you cannot access your object. Capture everything you can for best results."

A user interface may guide a user through instructions and/or visual indicators to position and orient the device to capture 2D perspective views of an object. Such 2D perspective views, for example, may provide images of the front, back, left side, and right side of the object. A user interface may determine that sufficient 2D perspective views have been obtained and, based on this and/or other criteria, determine that one or more orthographic views (e.g., top down) are also desired or needed. The user interface may guide the user through instructions and/or visual indicators to obtain one or more orthographic views of the object, e.g., with an arrow and/or text message. A user interface may fade a portion of the visual display (e.g., by 50%) while in orthographic view capture mode. The user interface may provide confirmation after the orthographic view capture is taken by undoing the change to the portion of the visual display and/or providing an indication (e.g., message "Complete!") indicating to the user that all of the necessary images of the object for the scan have been captured.

After completion is confirmed, a user interface may be used to instruct a user to test the scan by attempting to detect the object based on the scan. If the object cannot be found during such a test, a message may be provided, e.g., a message indicating that "We cannot find this object" and an option to retry the test or redo the scan. The user interface may continue to attempt to detect the object as the user moves around and may provide a message "Try detecting your object from different angles." The user interface may enable the user to review the captures and decide whether to discard or restart.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions computer-executable on a device to perform operations comprising:
providing, in a user interface, an indicator comprising a plurality of elements each indicating a different direction of multiple possible directions from which images of a physical object may be captured;
modifying the indicator based on a detected direction of the device relative to the physical object, wherein multiple elements of the plurality of elements are altered at the same instant in time to indicate a current direction of the device relative to the physical object;
capturing a first set of images of the physical object from a subset of the multiple possible directions;
modifying a visual characteristic of one or more of the elements of the indicator corresponding to the subset to graphically distinguish directions for which captured images have been captured from directions for which additional image captures are needed;
capturing a second set of images of the physical object from the directions for which additional image captures are needed; and
generating a model of the physical object using the first and second sets of images.

2. The non-transitory computer-readable storage medium of claim 1, wherein the operations further comprise: detecting the current direction of the device relative to the physical object based on detecting a change in the current direction of the device in a coordinate system of a physical setting in which the physical object is located.

3. The non-transitory computer-readable storage medium of claim 1, wherein the operations further comprise detecting the current direction of the device relative to the object in a physical setting based on motion data from a motion sensor on the device indicating a change in position or orientation of the device.

4. The non-transitory computer-readable storage medium of claim 1, wherein the indicator comprises the plurality of elements displayed around imagery of the physical object captured by a sensor of the device.

5. The non-transitory computer-readable storage medium of claim 4, wherein the plurality elements are displayed in an arcuate arrangement around the imagery of the physical object.

6. The non-transitory computer-readable storage medium of claim 1, wherein a first element of the plurality of elements represents a first device direction, and wherein modifying the indicator comprises:
changing a visual characteristic of the first element from a first state to a different second state when the current direction of the device matches the first device direction; and
returning the visual characteristic of the first element to the first state when the current direction of the device does not match the first device direction.

7. The non-transitory computer-readable storage medium of claim 1, wherein a first element of the plurality of elements represents a first device direction, and wherein modifying the indicator comprises:

after capturing an image of the object when the current direction of the device matches the first device orientation, changing a visual characteristic of the first element from a first state to a different second state.

8. The non-transitory computer-readable storage medium of claim 7, wherein modifying the indicator comprises: maintaining the display of the visual characteristic of the first element in the second state when the current direction of the device does not match the first device orientation.

9. The non-transitory computer-readable storage medium of claim 1, wherein modifying the indictor based on the detected direction comprises:
expanding a first element a first amount;
identifying one or more additional elements based on proximity to the first element; and
expanding the one or more additional elements a second amount, wherein the second amount is less than the first amount.

10. The non-transitory computer-readable storage medium method of claim 9, wherein expanding the one or more additional elements the second amount indicates that a current image will provide image capture data relevant to multiple directions.

11. The non-transitory computer-readable storage medium of claim 1, wherein the model comprises features for detection of the physical object in sensor images.

12. A system comprising:
a non-transitory computer-readable storage medium;
a camera; and
one or more processors coupled to the non-transitory computer-readable storage medium, wherein the non-transitory computer-readable storage medium comprises program instructions that, when executed on the one or more processors, cause the device to perform operations comprising:
providing, in a user interface, an indicator comprising a plurality of elements each indicating a different direction of multiple possible directions from which images of a physical object may be captured;
modifying the indicator by changing a visual characteristic of a first element from a first state to a different second state based on a detected direction of the device relative to the physical object matching a current device direction, wherein the visual characteristic of the first element returns to the first state based on the detected direction of the device relative to the physical object differing from the current device direction;
capturing a first set of images of the physical object from a subset of the multiple possible directions;
modifying a visual characteristic of one or more of the elements of the indicator corresponding to the subset to graphically distinguish directions for which captured images have been captured from directions for which additional image captures are needed;
capturing a second set of images of the physical object from the directions for which additional image captures are needed; and
generating a model of the physical object using the first and second sets of images.

13. The system of claim 12, wherein the indicator comprises a plurality of elements displayed around the imagery of the physical object captured by a sensor of the device.

14. The system of claim 13, wherein the plurality elements are arranged in an arcuate arrangement.

15. The system of claim 13, wherein modifying the indicator comprises changing a visual characteristic of one or more of the displayed elements to indicate the detected direction of the device relative to the physical object.

16. The system of claim 12, wherein modifying the indicator comprises:
   changing a visual characteristic of a first subset of elements from the first state to [a] the second state to indicate the current direction of the device; and
   returning the visual characteristic of a second subset of elements from the second state to the first state to indicate that the device is no longer oriented in a prior direction.

17. The system of claim 12, wherein the operations further comprise:
   receiving input to capture an image; and
   modifying the indicator based on the direction of the device relative to the physical object when the input is received.

18. The system of claim 12, wherein generating the model comprises generating the model based on identifying a portion of the model corresponding to the physical object based on a subset of the images recorded as capture images based on input.

19. The system of claim 18, wherein the portion of the model corresponding to the physical object is identified based on identifying a volume of space based on the capture images.

20. The system of claim 12, wherein the model comprises features for detection of the physical object in sensor images.

21. A method comprising:
   at a device comprising a processor:
      providing, in a user interface, an indicator comprising a plurality of elements each indicating a different direction of multiple possible directions from which images of a physical object may be captured;
      modifying the indicator by changing a visual characteristic of a first element from a first state to a different second state based on a detected direction of the device relative to the physical object matching a current device direction, wherein the visual characteristic of the first element returns to the first state based on the detected direction of the device relative to the physical object differing from the current device direction;
      capturing a first set of images of the physical object from a subset of the multiple possible directions;
      modifying a visual characteristic of one or more of the elements of the indicator corresponding to the subset to graphically distinguish directions for which captured images have been captured from directions for which additional image captures are needed;
      capturing a second set of images of the physical object from the directions for which additional image captures are needed; and
      generating a model of the physical object using the first and second sets of images.

22. The method of claim 21, wherein the model comprises features for detection of the physical object in sensor images.

* * * * *

UNITED STATES PATENT AND TRADEMARK OFFICE
CERTIFICATE OF CORRECTION

PATENT NO. : 12,100,229 B2
APPLICATION NO. : 17/406134
DATED : September 24, 2024
INVENTOR(S) : Etienne Guerard et al.

It is certified that error appears in the above-identified patent and that said Letters Patent is hereby corrected as shown below:

In the Claims

Claim 16, Column 21, Line 8 reads:
"... from the first state to [a] the second state to ..."

Should read:
--... from the first state to the second state to ...--

Signed and Sealed this
Sixth Day of May, 2025

Coke Morgan Stewart
*Acting Director of the United States Patent and Trademark Office*